United States Patent [19]

Kobashi et al.

[11] 4,248,812

[45] Feb. 3, 1981

[54] PROCESS FOR PRODUCING A RUSH-LIKE STRUCTURE

[75] Inventors: Toshiyuki Kobashi; Masahiko Ozaki; Noboru Abe, all of Okayama, Japan

[73] Assignee: Japan Exlan Company Limited, Osaka, Japan

[21] Appl. No.: 921,169

[22] Filed: Jun. 30, 1978

[30] Foreign Application Priority Data

Jul. 18, 1977 [JP] Japan .................................. 52-86264
Dec. 29, 1977 [JP] Japan ............................... 52-160020

[51] Int. Cl.³ .............................................. B29H 7/20
[52] U.S. Cl. .............................. 264/51; 260/29.6 AN; 264/53; 264/206; 264/211; 264/234; 428/376
[58] Field of Search ................... 264/206, 51.53, 234, 264/211; 260/29.6 AN, 29.6 AB; 428/376, 398

[56] References Cited

U.S. PATENT DOCUMENTS

| | | | |
|---|---|---|---|
| 3,774,387 | 11/1973 | Woodell | 264/182 |
| 3,873,508 | 3/1975 | Turner | 264/182 |
| 3,896,204 | 7/1975 | Goodman et al. | 264/204 |
| 3,984,601 | 10/1976 | Blickenstaff | 260/29.6 AN |
| 3,991,153 | 11/1976 | Klausner et al. | 264/206 |
| 4,049,605 | 9/1977 | Kobashi et al. | 260/29.6 AN |
| 4,062,857 | 12/1977 | Kobashi et al. | 260/29.6 AN |
| 4,108,818 | 8/1978 | Odawaua et al. | 264/182 |

FOREIGN PATENT DOCUMENTS

| | | | |
|---|---|---|---|
| 45-34778 | 11/1970 | Japan | 264/206 |
| 47-23905 | 7/1972 | Japan | 264/206 |
| 50-4033 | 2/1975 | Japan | 264/206 |
| 51-60734 | 5/1976 | Japan | 264/206 |

*Primary Examiner*—Jay H. Woo
*Attorney, Agent, or Firm*—Wenderoth, Lind & Ponack

[57] ABSTRACT

A process for producing a synthetic rush-like structure which comprises causing an acrylonitrile polymer composition in a substantially melted state (Polymer A or B or C) to flow down towards a spinning orifice; adjusting the pressure of the system in which the melt just before the orifice is present to within a specific range; extruding the melt to form a foamed product; and subjecting the foamed extrudate to heat treatment, thereby obtaining a synthetic rush-like structure resembling the natural rush plant in outer skin structure and internal structure and having excellent sensory and practical properties.

25 Claims, No Drawings

PROCESS FOR PRODUCING A RUSH-LIKE STRUCTURE

BACKGROUND OF THE INVENTION

1. Field of the Invention

The present invention relates to a process for producing a rush-like structure. More specifically, the invention is concerned with a process which comprises preparing an acrylonitrile polymer composition in a substantially melted state either by polymerizing acrylonitrile only or a monomer mixture containing acrylonitrile, in the presence of a small amount of water and at high temperature under increased pressure, or by heat-melting a mixture of an acrylonitrile polymer consisting singly of acrylonitrile or containing acrylonitrile, and water or a mixture of said mixture and a plasticizing agent; causing said polymer composition in a melted state to flow down towards a spinning orifice; adjusting the pressure of the system in which the melt just before the orifice is present, to within a specific range; extruding the melt to form a foamed product; and subjecting the foamed product thus obtained to a heat treatment, thereby obtaining a synthetic rush-like structure resembling the natural rush plant in outer skin structure and internal structure and having excellent sensory and practical properties.

2. Description of the Prior Art

In Japan, tatami surface sheets, floor mats and fancy patterned mats composed mainly of the rush plant (the genus Juncus) have been habitually used from old times, but their production is gradually decreasing in recent years. This is caused, on one hand, by the increasing difficulty in cultivating good quality rushes as a result of air pollution extending around the cultivating areas of the rush with their gradual change into industrial areas, and on the other hand, by the difficulty in ensuring sufficient labor supply because much labor is required for cultivating the rush.

Under such circumstances, positive attempts are being made to produce substitutes for the natural rush from synthetic plastics which are industrially produced on a large scale and are stable in quality. For example, floor mats woven from hollow linear products or foamed linear products of polypropylene, polyethylene, polyvinyl chloride, etc. have come to be produced on an experimental basis or even sold on the market. Especially, polypropylene-based synthetic rushes have rapidly spread by virtue of their inexpensiveness, strength and beauty. For reference, prior art processes of producing synthetic rushes from synthetic plastics are disclosed, for example, in Japanese Pat. Publication No. 34778/1970 (foamed polyethylene-based products), Japanese Pat. Publication No. 4033/1975 (polypropylene-polyvinyl alcohol-based products), Japanese Utility Model Publication No. 27341/1970 (polyolefin-based products), Japanese Pat. Publication No. 23905/1972 (foamed polyvinyl alcohol-based and foamed polyvinyl chloride-based products), etc.

Although the polypropylene-, polyethylene-, polyvinyl chloride-, or polyvinyl alcohol-based synthetic plastics have the advantage of inexpensiveness and mass production, they have not yet provided synthetic rushes which are superior to the natural rush in shape and practical functions. Thus, the synthetic rushes have not been able to exhibit advantages of the rush plant, such as sufficient moisture absorbing capacity (water absorbing capacity), elastic recovery, dimensional stability and a refreshing feel, and have not yet exceeded the natural rush in their usefulness.

On the other hand, tatami surface sheets, etc. composed of the natural rush are not completely free from defects in their function, and in fact they have several problems remaining unsolved for practical use. Thus, their users are aware that they are still insufficient, particularly in resistance to light, dyeability, uniformity in quality and abrasion resistance.

When we thus examine the prior arts, we can see that the tatami which is indispensable for Japanese life still involves various problems, and a number of points to be improved remain unsolved in the use of the tatami from natural or synthetic rushes.

STATEMENT OF THE INVENTION

In the light of such a situation, we have researched to improve the defects attendant on the conventional products. As a result, we have found that a synthetic rush-like structure, produced by a specific process, composed of an acrylic polymer and formed into natural rush-like foamed structure, can eliminate all the defects of the conventional products and can be advantageously employed for tatami surface sheets.

An object of the present invention is to provide a technical means for producing a novel synthetic rush-like structure.

Another object of the invention is to provide a process for producing an artificial rush-like structure which can be advantageously used as the material for tatami surface sheets, floor mats, fancy patterned floor mats, etc. and which has a moderate elastic recovery and a refreshing feel, and is excellent in light stability, dyeability, uniformity in quality, abrasion resistance, water absorbing capacity and moisture absorbing capacity.

Other objects of the invention will become apparent from the following concrete explanation of the invention.

Such objects of the invention are attained by preparing an acrylonitrile polymer composition in a substantially melted state either by polymerizing acrylonitrile only or a monomer mixture consisting of acrylonitrile and at least one ethylenically unsaturated compound, in a system in which water is present in an amount within the range of from 3 to 50 weight %, under a pressure equal to or above the vapor pressure generated in the polymerization system under polymerization conditions (this acrylonitrile polymer composition is hereinafter referred to as Polymer Melt A), or by heat-melting a mixture of 40–90 weight % of an acrylonitrile polymer (consisting singly of acrylonitrile or obtained from at least 40% acrylonitrile and at least one ethylenically unsaturated compound), and 60–10 weight % of water (this mixture is hereinafter referred to as Mixture A), or heat-melting a mixture of 40–90 weight % of said acrylic polymer and 60–10 weight % of water, to which is added a plasticizing agent in an amount less than 60 weight % based on the total of said polymer and water (this mixture is hereinafter referred to as Mixture B) (the former melt from Mixture A is hereinafter referred to as Polymer Melt B and the latter melt from Mixture B is referred to as Polymer Melt C); causing said melt thus obtained to flow down towards a spinning orifice; adjusting the pressure of the system in which the melt just before the orifice is present, to 0.5–20 kg/cm$^2$; extruding the melt to form a foamed product; and subjecting the thus-obtained foamed product to a heat treatment.

The synthetic rush-like structure produced by employing such a production process has a peculiar foamed structure like that of the rush plant, with the surface layer formed into a wrinkled structure in the lengthwise direction and the internal layer having a foamed structure. Therefore, the synthetic rush can provide a refreshing feel and a luster like the tatami sheet produced from the natural rush. Furthermore, by virtue of a high wettability of the acrylic polymer employed (as a result of a high affinity to water of the nitrile groups in the acrylonitrile polymer), it has a moderate water absorbing capacity and moisture absorbing capacity. It is further provided with an excellent elastic recovery and dimensional stability. In addition, it has improved uniformity of quality and luster.

On account of the composition of the material employed (acrylic polymer), the artificial rush according to the present invention is given a markedly improved light stability and dyeability, by which its commercial value is further elevated.

In addition to its light weight and easy handling, the synthetic rush-like structure of the present invention has an advantage in that it can be easily woven by the conventional tatami surface sheet weaving machine.

By integrated employment of the preparation of the specific Polymer Melt A or Polymer Melt B or Polymer Melt C, the extrusion of the melt under a predetermined controlled pressure so as to form a foamed product, and the heat treatment of the thus obtained foamed product, it has been at last possible to produce the synthetic rush-like product according to the present invention furnished with various sensory and practical functions which have not been found in conventional artificial rushes composed of synthetic plastics and which even the natural rush does not have. Thus, this is considered very important from the industrial and social viewpoint.

Although a clear account has not yet been given of the melting phenomenon of the acrylonitrile polymer (Polymer Melt A) produced under such a particular condition of pressure and heat, it is supposed that the cohesive force due to the interaction between the —C≡N groups of the molecular chains of the acrylonitrile polymer is markedly weakened by a synergetic action of water and unreacted monomer(s) remaining in the polymerization product, and consequently the resulting polymer becomes easily meltable.

DESCRIPTION OF PREFERRED EMBODIMENT

The pressurized homogeneous phase polymerization employed for producing the synthetic rush-like structure is applied to the polymerization of acrylonitrile only or a monomer mixture containing combined therein at least 40 weight %, preferably more than 60%, of acrylonitrile and at least one ethylenically unsaturated compound. The ethylenically unsaturated compounds, which are the copolymerization components, include known unsaturated compounds copolymerizable with acrylonitrile, for example, vinyl halides and vinylidene halides such as vinyl chloride, vinyl bromide, vinyl fluoride, vinylidene chloride, etc.; unsaturated carboxylic acids such as acrylic acid, methacrylic acid, maleic acid, itaconic acid, etc. and their salts; acrylic acid esters such as methyl acrylate, ethyl acrylate, butyl acrylate, octyl acrylate, methoxyethyl acrylate, phenyl acrylate, cyclohexyl acrylate, etc.; methacrylic acid esters such as methyl methacrylate, ethyl methacrylate, butyl methacrylate, octyl methacrylate, methoxyethyl methacrylate, phenyl methacrylate, cyclohexyl methacrylate, etc.; unsaturated ketones such as methyl vinyl ketone, phenyl vinyl ketone, methyl isopropenyl ketone, etc.; vinyl esters such as vinyl formate, vinyl acetate, vinyl propionate, vinyl butyrate, vinyl benzoate, etc.; vinyl ethers such as methyl vinyl ether, ethyl vinyl ether, etc.; acrylamide and its alkyl substitutes; unsaturated sulfonic acids such as vinyl sulfonate, allyl sulfonate, methallyl sulfonate, p-styrene sulfonate, etc. and their salts; styrene and its alkyl- or halogen-substitutes such as α-methylstyrene, chlorostyrene, etc.; allyl alcohol and its esters and ethers; basic vinyl compounds such as vinylpyridine, vinylimidazole, dimethylaminoethyl methacrylate, etc.; vinyl compounds such as acrolein, methacrolein, vinyldene cyanide, glycidyl methacrylate, methacrylonitrile, etc.

In the production of the rush-like structure using such a monomer, the amount of water to be introduced into the polymerization system is within the range of 3 to 50 weight %, preferably 10 to 30 weight %, and more preferably 12 to 25 weight %, based on the total weight of water and the monomer forming the polymerization system. In case the amount of water introduced into the polymerization system is less than 3 weight %, the melt viscosity of Polymer Melt A is markedly elevated to impair the extrudability of the melt from the spinning orifice and the natural rush-like foamed structure cannot be obtained. If the amount of water exceeds 50 weight %, the melt viscosity of the melt is too low, which results in breakage of the foamed product and remarkably impaired uniformity of quality of the product obtained.

It is necessary that the polymerization system should be maintained at a pressure equal to or above the vapor pressure generated in the polymerization system under the polymerization conditions. As regards the polymerization temperature, it is necessary to employ a temperature above 120° C., preferably at least 130° C. By satisfying such a polymerization condition, it is possible to obtain transparent Polymer Melt A having fluidity. Then, after extrusion and post-treatment, the melt is formed into a high-quality synthetic rush-like structure. Of course, the employment of a polymerization condition outside the above-specified range makes difficult the attainment of the objects and effects of the present invention. It is desirable that the upper limit of the polymerization temperature should be lower than 300° C., preferably not higher than 250° C. in consideration of decomposition and color change of the resulting melt. As regards the polymerization pressure, any pressure may be employed so long as it is above autogeneous pressure, but it is generally suitable to polymerize at a pressure between 5 and 55 kg/cm$^2$ from the standpoint of industrial operation.

As the polymerization initiating means used for the polymerization in the present invention, all known processes can be employed, for example, radical-polymerization using radical-generating agents such as organic or inorganic peroxides, azo compounds, etc.; direct photo-polymerization under irradiation of ultraviolet ray or photo-sensitized polymerization in the presence of a photo-sensitizer; and photo-polymerization under irradiation with γ-ray. Particularly, by using as the polymerization means an oil-soluble or water-soluble radical-generating agent as the catalyst, the objects and effects of the present invention can be effectively attained. Such oil-soluble radical-generating agents include, for example, organic peroxides such as di-tert-butyl diperoxyphthalate, tert-butyl hydroperoxide, 2,5- dimethyl-2,5-di-tert-butyl peroxyhexine, etc.; and azo compounds such as 4-azobis-4-cyanopentanoic amide, 1-azobis-1-cyclohexane carbonitrile, etc. As water-soluble radical-generating agents, there may be mentioned hydrogen peroxide, persulfates, etc. It is desirable that the amount of the catalyst used should be generally 0.01-5 weight %, preferably 0.1-3 weight %.

The polymerization duration varies depending on the polymerization initiating means, kind and amount of initiating agents, polymerization temperature, etc., but values within the range of generally from 10 minutes to 2 hours, preferably from 20 minutes to 1 hour, are employed. Such short-time attainment of the polymerization reaction according to the present invention is also related to the advantage that the synthetic rush of the present invention is produced at high production efficiency and supplied at a low price.

Within the range in which no adverse effect is exerted on the pressurized homogeneous polymerization of the present invention, it is permissible to add known discoloration agents, stabilizers against heat, flame retardants, softeners, antistatic agents, perfumes, pigments, antifungal agents, lubricants, soil preventing agents, stabilizers against ultraviolet ray, dyes, deodorants, delustering agents, etc. to the polymerization system in order to modify the properties of the synthetic rush-like structure which is the final product. Of course, these modifiers may be introduced directly into Polymer Melt A which has been produced by the pressurized homogeneous polymerization.

Transparent homogeneous Polymer Melt A in a substantially melted state produced according to the present invention is produced at a polymerization conversion(monomer-to-polymer conversion) of 50-90% and has a polymer molecular weight of 45,000 to 80,000 so that it is very favorable starting material for the production of the synthetic rush because the synthetic rush-like structure produced from an acrylic polymer fluid having a polymerization conversion and a molecular weight within the above-specified range has a moderate strength (resistance to abrasion) and elastic recovery, and in addition has a foamed structure (with the surface layer having a wrinkled structure and the internal layer forming numberless independent and continuous air bubbles) resembling that of the rush plant.

Mixture A employed for producing the synthetic rush-like structure is obtained by mixing 40-90 weight %, preferably 50-85 weight %, of an acrylic polymer (produced by homopolymerization of acrylonitrile or by copolymerization of at least 40%, preferably 60%, of acrylonitrile and at least one ethylenically unsaturated compound) and 60-10 weight %, preferably 25-15 weight %, of water.

Mixture B is obtained by mixing 40-90 weight %, preferably 50-85 weight %, of the thus-obtained acrylic polymer, 60-10 weight %, preferably 25-15 weight %, of water, and less than 60 weight %, preferably 0.5-10 weight %, based on the total amount of said acrylic polymer and water, of a plasticizer. In case the mixing ratio is outside the suitable range, a melt viscosity suitable for the foaming extrusion cannot be obtained, which results in breakage of the foamed product and remarkably impaired uniformity of quality of the product obtained. As regards the ethylenically unsaturated compounds which are the copolymerization components, the previously mentioned compounds can be used.

The plasticizing agents employed for obtaining Mixture B include organic liquids having a dielectric constant above 30 (for example, formamide, acetamide, glycerin, furfural, acrylonitrile, acetonitrile, lactonitrile, ethylene glycol, propylene glycol, p-nitroaniline, o-nitroaniline, etc.) and/or hydrophilic polymers (for example polyvinyl alcohol, polyethylene glycol, polyacrylamide and its derivatives, polyacrylic acid and its salts, polyvinylpyrrolidone, sodium alginate, starch, gelatine, casein, etc.). Particularly, when acrylonitrile, glycerin or ethylene glycol is employed as the organic liquid, and polyvinyl alcohol or polyethylene glycol is employed as the hydrophilic polymer, the objects of the present invention can be advantageously attained.

As regards the mixing means for obtaining Mixture A or Mixture B, no particular restriction is placed on them, and any usual mixing or stirring means can be employed.

After the heating operation, the thus-prepared Mixture A or Mixture B is respectively converted to Polymer Melt B or Polymer Melt C which is in a substantially melted state. It is desirable that the heating temperature employed at this time should be at least 110° C., preferably at least 120° C. By this heating operation, fluid, transparent Polymer Melt B or Polymer Melt C can be obtained, and by the later-mentioned foaming extrusion and post-treatment, it is formed into a high quality synthetic rush-like structure. It is desirable that the upper limit of the heating temperature should be not higher than 300° C., preferably not higher than 250° C., in consideration of decomposition and color change of the mixture.

Within the range in which no adverse effect is exerted on the production of Polymer Melt B or Polymer Melt C according to the present invention, it is permissible to add known discoloration agents, stabilizers against heat, flame retardants, softeners, antistatic agents, perfumes, pigments, antifungal agents, lubricants, soil preventing agents, stabilizers against ultraviolet ray, dyes, deodorants, delustering agents, etc. to Mixture A or Mixture B in order to modify the properties of the synthetic rush-like structure which is the final product.

The thus-prepared Polymer Melt B or Polymer Melt C is caused to flow towards the spinning orifice while being maintained in this state. Then, with the pressure of the system in which the melt just before the orifice is present adjusted to 0.5-20 kg/cm$^2$, preferably 5-15 kg/cm$^2$, the melt is extruded through the orifice to convert the melt to a foamed product. Such pressure control constitutes an important factor contributing to the production of the synthetic rush suitable to the present invention. In case the pressure is less than 0.5 kg/cm$^2$, the fluid just before the orifice foams in excess to increase the viscosity of the fluid, and this remarkably lowers the shaping ability. In case the pressure exceeds 20 kg/cm$^2$, the fluid foams suddenly during or just after passing through the orifice and this hinders the formation of a well-shaped foamed product. Thus, it is important in the present invention to maintain the pressure of the system in which the melt just before the spinning orifice is present (low pressure zone) within the above-specified range, regardless of the pressure of the polymerization system, namely it is important to maintain the pressure difference between the low pressure zone and the extrusion zone within the above range. For such pressure control means, any known pressure reduction means can be employed. Conventional pressure reduction means include (I) a method of providing a valve, gear pump, Kenix mixer, etc. in the fluid conveying pipe, (II) a method of varying the cross-sectional area of the fluid conveying pipe from a suitable place, (III) a method of varying the length of the passageway of the fluid, (IV) a method of varying the viscosity of the fluid in the fluid conveying pipe by varying the temperature, (V) a method of controlling the amount of introduction of the fluid into the fluid conveying pipe, (VI) a method of varying the diameter of the fluid conveying pipe at its outlet end, etc. In the practice of the present invention, any combination of these methods may be employed. We do not fully understand why the natural rush-like foamed structure can be produced by such pressure control, but we suppose that, by the action of water, water+unreacted monomer, or water+plasticizer present in the acrylonitrile polymer employed, foam seeds capable of forming many, uniform independent and continuous air bubbles are generated in the fluid melt (Polymer Melt A or B or C). As regards the spinnerette used for the foaming extrusion, it may have a single orifice or a plurality of orifices having a diameter of 0.1-5 mm, preferably 0.8-3 mm. As for the extrusion atmosphere, any atmosphere may be employed, for example, a pressurized zone in which water vapor or heated air is present, an atmospheric pressure zone in which water vapor, etc. is present, but among these, the use of air at atmospheric pressure is advantageous.

The foamed product thus extruded is then produced into a synthetic rush which bears a close resemblance to the natural rush plant by being subjected to a jet stretch operation at the same time with the foam formation in the extrusion atmosphere. The stretching ratio in the jet stretch operation is 1.5-10 times, preferably 2-7 times. In case the stretching ratio is out of this range, the synthetic rush-like structure cannot be produced which has a lengthwise wrinkled structure on the surface layer and groups of peculiar bubbles in the internal layer and which satisifies practical strength.

It is necessary that the thus-obtained foamed product should be subjected to a heat treatment. The preferred temperature in this heat treatment is a temperature above 90° C. The atmosphere of the heat treatment can be selected from a hot water medium at 90°-100° C., dry hot air or inert gas medium at 90°-250° C., or wet heat medium at 100°-250° C. So long as the above-mentioned temperature range is satisfied, hot roller or hot plate heating, infrared ray irradiation, or induction heating (micro-wave heating) may be used. Such heat treatment is an indispensable step in producing the artificial rush, because it removes the water and plasticizer in the fluid melt (Polymer Melt B or C) to elevate the stretching effect, and gives rise to a fine foaming phenomenon which leads the surface shape and strength of the foamed product to a more close resemblance to the rush plant. It is also possible to effect a stretching operation (secondary stretching) at the same time with the heat treatment. By this stretching, the practical strength (abrasion resistance) can be improved to a further extent. It is desirable that the stretching ratio in the secondary stretching operation should be 1-5 times, preferably 1.1-3 times.

The foamed product thus heat-treated, and stretched as required is then subjected to either restricted shrinkage treatment or free shrinkage treatment, and is cut into predetermined lengths to produce the synthetic rush which is the final product. By this shrinkage treatment, the dimensional stability is further improved.

The synthetic rush produced by the above-mentioned process is dyed as required. The dyeing treatment is effected before, during or after the heat treatment.

The rush-like structure obtained by employing such production means has an average diameter of 0.2-6 mm, and a bulk density (which will be defined later) of 0.05-0.8 g/cm$^3$, preferably 0.1-0.5 g/cm$^3$, and has a peculiar rush-like foamed structure with the surface layer having a wrinkled structure in the lengthwise direction and the internal layer having a foamed structure. In addition, the rush-like structure has eliminated all the unfavorable problems which the conventional synthetic rush-like linear products or even the rush plant has presented. Therefore, the synthetic rush-like structure according to the present invention is noteworthy in that it will find a wide field of applications such as high quality tatami surface sheets, floor mats, fancy patterned floor mats, decoration materials, etc.

The present invention will be explained hereunder in more detail with reference to examples, but it is to be understood that the scope of the invention is by no means limited by the description of these examples, in which all parts and percentages are shown by weight unless otherwise indicated.

The bulk density described in the examples was measured by the following method:

DEFINITION OF BULK DENSITY

The bulk density (D) of the synthetic rush-like structure is defined by the following formula:

$$D = W/\{(\bar{S}) \times N\} \quad (g/cm^3)$$

wherein W (g) means the weight of the structure, $\bar{S}$ (cm$^2$) means the apparent cross-sectional area of the structure, and N (cm) means the length of the structure. The above-mentioned $\bar{S}$ is obtained as follows:

$$\bar{S} = \left\{ \frac{\pi}{4} \sum_{i=1}^{n} (di)^2 \right\} /n \quad (cm^2)$$

wherein di (cm) represents an apparent diameter of the structure, the measurement being repeated i times (i=1~n) in the lengthwise direction at arbitrary intervals.

CALCULATION OF BULK DENSITY

The bulk density was calculated as follows according to the above-mentioned formula:

A 100 cm length of the rush-like structure to be measured is prepared. The apparent diameter (d) at both ends of the sample and at nine measuring points taken in the lengthwise direction at intervals of 10 cm, are measured with a pair of calipers or a micrometer twice at different measuring positions, namely the second measurement is made with the sample rotated 90° in the peripheral direction.

From each value thus measured (di; i=1~22), the mean value of the respective cross-sectional areas $\pi(i^2/4)$, namely the apparent cross sectional area ($\bar{S}$), is obtained according to the following formula (wherein each cross-section at the 11 measuring places is assumed to be a circle):

$$\bar{S} = \left\{ \frac{\pi}{4} \sum_{i=1}^{22} (di)^2 \right\} /22 \quad (cm^2)$$

Then the weight (Wg) of the sample (100 cm in length) is determined and the bulk density (D) is obtained by the following formula:

$$D = W / \{(\bar{S}) \times 100\} \quad (g/cm^3)$$

Of course, the greater the value D, the greater is the bulk density.

EXAMPLE 1

Two kinds of acrylic polymer compositions (Mixture A) were prepared by mixing an acrylic polymer (consisting of 90% acrylonitrile and 10% methyl acrylate) and water as shown in Table 1. Each polymer composition was supplied to a known melt-spinning apparatus and was melted at 160° C. under autogeneous pressure. The melt was extruded continuously through a single orifice, 1.2 mm in diameter, into an atmospheric pressure zone, with the pressure of the system in which the melt just before the orifice was present maintained as shown in Table 1, while the extrudate was jet-stretched at a stretching ratio of two times.

The foamed products (four kinds) were then heat-treated in a hot air current while being stretched 1.3 times. After dyeing and finishing operations, they were dried in a hot air current at 120° C. for 10 minutes. Thereafter, the foamed products were cut into 1 meter lengths to obtain synthetic rush-like structures which were the final products. The appearance and the bulk density of the final products are given in comparison with those of the natural rush plant.

TABLE 1

|  | Acrylonitrile polymer composition | | Controlled pressure (kg/cm²) | Properties of synthetic rush | |
|---|---|---|---|---|---|
|  | Acrylic polymer (%) | Water (%) |  | Shape, appearance, etc. | Bulk density (%) |
| Synthetic rush | 80 | 20 | 0.4 | Continuous extrusion impossible | — |
|  |  |  | 3.0 | Good foamed structure | 0.24 |
|  |  |  | 21.0 | Harsh feel | — |
|  | 30 | 70 | 6.0 | Shaping impossible* | — |
| Natural rush plant |  |  |  | Foamed structure | 0.23 |

*Gushing vapor hindered formation of a continuous product.

It will be understood from the results in Table 1 that the synthetic rush according to the present invention closely resembles the rush plant.

The synthetic rush thus obtained was then supplied to a tatami surface weaving machine and was produced into a tatami surface sheet, which was light in weight, excellent in moisture absorbing capacity, water absorbing capacity, dyeability and light stability, and had a very high commercial value. An abrasion test made for a natural rush tatami and a synthetic rush tatami according to the present invention showed that the latter was more excellent in abrasion resistance.

EXAMPLE 2

Eighty parts of the same acrylic polymer and 20 parts of water were mixed with the plasticizers shown in Table 2 (preparation of Mixtures B). Each mixture was melted by the same heating operation as in Example 1. Thereafter, each melt was extruded continuously through a single orifice, 1.3 mm in diameter, into an atomspheric pressure zone, with the pressure of the system in which the melt just before the orifice is present maintained at 60 kg/cm², while the extrudate was jet-stretched at a stretching ratio of 4 times.

The thus-obtained foamed products were processed by the same operation as in Example 1 into final synthetic rushes, the properties of which are shown in Table 2.

TABLE 2

| | Acrylonitrile polymer composition | | | | Synthetic rush | |
|---|---|---|---|---|---|---|
| No. | Acrylonitrile polymer (%) | Water (%) | Plasticizer (%) | | Shape, appearance, etc. | Bulk density (g/cm³) |
| 1 | 80 | 20 | 30 | Acrylonitrile | Good foamed structure | 0.20 |
| 2 | 80 | 20 | 62 | Acrylonitrile | Breakage occurred | 0.03 |
| 3 | 85 | 15 | 25 | PVA* | Good foamed structure | 0.21 |
| 4 | 85 | 15 | 61 | PVA* | Bubble size large; Touch no good | 0.04 |

*PVA = polyvinyl alcohol
Degree of saponification = 98
Degree of polymerization = 500

It is understood from Table 2 that the synthetic rushes (No. 1 and No. 3) are of very good quality.

On the other hand, a foamed product produced by the same extrusion operation but without the after-treatments did not have a foamed structure like the natural rush, and in addition its strength was not sufficient and could not be woven by an automatic weaving machine.

It is apparent from the above description that, to produce the synthetic rush-like structure according to the present invention, it is necessary to combine the steps of preparing an acrylonitrile polymer composition having the above-specified composition, extruding the thus-obtained melt under the above-mentioned controlled pressure to form a foamed product and heat-treating the foamed product thus obtained.

EXAMPLE 3

Continuous polymerization of acrylonitrile was carried out in a polymerization tank, 740 ml in capacity, equipped with anchor-shaped stirring vanes, a temperature detecting tube, a pressure detecting tube and a jacket. The polymerization tank had a stainless steel feed pipe attached to its bottom. The feed pipe was connected to a plurality of plunger pumps. On the side wall of the tank, a needle valve was attached, and on the other end of the valve, a nozzle having a fine orifice, 1.3 mm in diameter, was attached. The flow passageway in the nozzle has a cock which can increase or decrease the cross-section of the passageway. The jacket of the polymerization tank was provided with a pipe to flow steam or compressed air. The jacket was also equipped with detecting tubes for detecting the temperature and pressure of the melt in the polymerization tank.

Upon starting the polymerization, first the needle valve was closed completely, and then the pumps were started to introduce the following monomer mixture and aqueous solution into the polymerization tank maintained at 135° C., from the feed pipe.

Monomer mixture: Acrylonitrile/methyl acrylate=91/9 (Feed flow rate: 12.44 ml/min.)

Aqueous solution: containing 8% ammonium persulfate and 3.2% sodium bicarbonate (Feed flow rate: 2.36 ml/min)

After the polymerization proceeded and the polymerization tank was filled with the polymer in a melted state, the aperture of the needle valve was regulated so as to maintain the pressure in the tank at 25 kg/cm$^2$ (gauge pressure). Then, by controlling the diameter of the cock provided between the needle valve and the outlet of the orifice, the pressure of the flow passageway (the system in which the melt was present) was lowered to 3.0 kg/cm$^2$. With the pressure maintained under this condition, the melt in the polymerization tank was extruded continuously into an atmospheric pressure zone through the orifice, while the extrudate was jet-stretched at a stretching ratio of 2 times. The molecular weight of the melt was about 57,500 and the polymerization conversion was about 67%.

The thus-obtained foamed product was thereafter heat-treated while being stretched 1.3 times in length in a hot air current at 120° C. After dyeing and finishing, it was dried in a hot air current at 120° C. The foamed product was then cut into 1 m lengths to obtain a synthetic rush-like structure which was the final product.

The thus-obtained synthetic rush had a wrinkled structure on the surface layer and a good foamed structure in the internal layer. The apparent cross-sectional area ($\overline{S}$) and the bulk density (D) of the final product are shown in Table 3 in comparison with those of the natural rush.

TABLE 3

|  | Apparent cross-sectional area (cm$^2$) | Bulk density (g/cm$^3$) |
| --- | --- | --- |
| Product of the invention | 1.45 × 10$^{-2}$ | 0.24 |
| Natural rush | 1.77 × 10$^{-2}$ | 0.21 |

It is understood from the results in Table 3 that the synthetic rush according to the present invention closely resembles the rush plant.

The thus-obtained synthetic rush was then supplied to a conventional tatami surface sheet automatic weaving machine and was produced into a tatami surface sheet. The tatami thus produced was light in weight, and excellent in moisture absorbing capacity, dyeability, light resistance, etc. and had a very high commercial value. By an abrasion test made for a tatami from the natural rush and a tatami from the synthetic rush according to the present invention, it was proved that the latter was far superior to the former in abrasion resistance.

EXAMPLE 4

Polymerization was carried out under the same condition as in Example 3 except that the composition of the monomer mixture was changed to acrylonitrile/methyl acrylate=95/5, and the concentration of sodium bicarbonate was changed to 1.6%. The molecular weight of the thus-obtained polymer fluid was about 56,600 and the polymerization conversion was about 64.4%. After the polymerization tank was filled with the polymer in a melted state, the pressure in the polymerization tank was maintained at 30 kg/cm$^2$ (gauge pressure). Then, by the same operation as in Example 3, the pressure of the flow passageway (the system in which the melt is present) from the cock to the outlet end of the orifice was varied as shown in Table 4, and the melt in the polymerization tank was continuously extruded through an orifice to an atmospheric pressure zone, while the extrudate was jet-stretched at the ratio of 4 times.

The foamed product thus-obtained was then treated in the same way as in Example 3 and a synthetic rush-like structure cut into one-meter lengths was obtained which was the final product.

The appearance, shape and bulk density of the synthetic rush thus obtained are shown in Table 4.

TABLE 4

|  | Pressure just before the orifice (kg/cm$^2$) | Synthetic rush | |
| --- | --- | --- | --- |
|  |  | Shape, appearance, etc. | Bulk density (g/cm$^3$) |
| Products of the invention | 2.0 | A wrinkled structure on the surface layer and a good foamed structure in the internal layer | 0.21 |
|  | 8.0 |  | 0.25 |
|  | 14.0 |  | 0.32 |
| Comparative examples | 0.2 | Continuous extrusion was impossible | — |
|  | 23 | Bad surface shape (Harsh touch) | 0.32 |

It is understood from the results in Table 4 that the pressure control according to the present invention constitutes an important factor for producing the synthetic rush resembling the natural rush.

The three kinds of the above-mentioned synthetic rushes according to the present invention and the two synthetic rushes taken as comparative examples were respectively produced into tatami surface sheets. The former ones gave a touch and appearance like the natural rush plant, but the latter ones were both bad in operability and inferior in commercial value.

EXAMPLE 5

The following polymerization was carried out using the same polymerization tank as used in Example 3.

1.0% n-heptane as the foaming agent and 0.35% 2-mercaptoethanol as the chain transfer agent were mixed and dissolved with a monomer mixture consisting of 85 parts of acrylonitrile and 15 parts of methyl acrylate. On the other hand, a 3% aqueous solution of ammonium persulfate was prepared (pH=2.7). The monomer solution and the aqueous solution were then respectively supplied to the polymerization tank by means of plunger pumps at feed rates of 11.62 ml/min and 3.18 ml/min, respectively. The polymerization was caused to proceed while maintaining the temperature of the polymerization tank at 140° C. and the pressure at 28 kg/cm² (gauge pressure).

After the polymerization tank was filled with the polymer fluid in a melted state, the diameter of the cock provided in the passageway between the needle valve and the orifice outlet end was controlled so that the pressure in the passageway between the cock and the orifice outlet end will be 7.0 kg/cm². With the pressure maintained under this condition, the melt in the polymerization tank was extruded through an orifice, 1.3 mm in diameter, into an atmospheric pressure zone, while the extrudate was jet-stretched at the ratio of 3 times. The molecular weight of the fluid melt was 53,000 and the polymerization conversion was 71.5%.

The thus-obtained foamed product was thereafter stretched 1.13 times in length while travelling in hot air at 130° C., and was heat-fixed in dry hot air at 140° C. The relaxation ratio in this heat-fixation was 0%. The foamed product was then cut into 1.2 meter lengths to produce a synthetic rush-like structure which was the final product.

The synthetic rush thus obtained had a bulk density of 0.22 and the shape and appearance were not inferior to those of the natural rush. No difficulty was encountered in producing tatami surface sheets from this synthetic rush by means of an automatic weaving machine. The tatami thus obtained was particularly excellent in water absorbing capacity, light stability and elastic recovery and had a high practical value.

On the other hand, a foamed product produced for comparison by the same extrusion operation but without after-treatment did not have a foamed structure like the natural rush, and in addition its strength was insufficient and could not be woven by an automatic weaving machine.

It is apparent from the above description that, to produce the synthetic rush-like structure according to the present invention, it is necessary to combine the steps of preparing an acrylonitrile polymer composition by employing the above-mentioned particular polymerization condition, extruding the thus-obtained melt under the above-mentioned controlled pressure to form a foamed product and heat-treating the foamed product thus obtained.

What is claimed is:

1. A process for producing a rush-like structure, characterized by preparing an acrylonitrile polymer composition in a substantially melted state by polymerizing acrylonitrile only or a monomer mixture composed of acrylonitrile and at least one ethylenically unsaturated compound, in a system in which water is present in an amount within the range of 3 to 50 weight % based on the total weight of the monomers present and water, under a pressure equal to or above the vapor pressure generated in the polymerization system, at a temperature above 120° C.; causing the thus-obtained melt to flow down towards a spinning orifice; adjusting the pressure of the system in which the melt just before the orifice is present, to 0.5 to 20 kg/cm²; extruding the melt through the orifice to form a foamed product; and heat-treating the foamed product at a temperature above 90° C. to obtain a foamed structure having an average diameter of 0.2–6 mm and a bulk density of 0.1–0.5 g/cm³.

2. A process for producing a rush-like structure, characterized by preparing an acrylonitrile polymer composition in a substantially melted state by mixing 40–90 weight % of an acrylic polymer, obtained by polymerizing acrylonitrile only or at least 40 weight % acrylonitrile and at least one ethylenically unsaturated compound, with 60–10 weight % of water, and melting them together by heating; causing the thus-obtained melt to flow down towards a spinning orifice; adjusting the pressure of the system in which the melt just before the orifice is present to 0.5–20 kg/cm²; extruding the melt through the orifice to form a foamed product; and heat-treating the foamed product at a temperature above 90° C. to obtain a foamed structure having an average diameter of 0.2–6 mm and a bulk density of 0.1–0.5 g/cm³.

3. A process for producing a rush-like structure, characterized by preparing an acrylonitrile polymer composition in a substantially melted state by mixing 40–90 weight % of an acrylic polymer, obtained by polymerizing acrylonitrile only or at least 40 weight % acrylonitrile and at least one ethylenically unsaturated compound, 60–10% of water and a plasticizer in an amount less than 60 weight % based on the total amount of said polymer and water, and melting them together by heating; causing the thus-obtained melt to flow down towards a spinning orifice; adjusting the pressure of the system in which the melt just before the orifice is present to 0.5 to 20 kg/cm²; extruding the melt through the orifice to form a foamed product; and heat-treating the foamed product at a temperature above 90° C. to obtain a foamed structure having an average diameter of 0.2–6 mm and a bulk density of 0.1–0.5 g/cm³.

4. The process as claimed in claim 1 wherein the amount of the water is maintained within the range of 10 to 30 weight % based on the total amount of monomer and water.

5. The process as claimed in claim 1 wherein the amount of the water is maintained within the range of 12 to 25 weight % based on the total amount of monomer and water.

6. The process as claimed in claim 1 wherein the polymerization temperature is 130° to 250° C.

7. The process as claimed in claim 1 wherein the polymerization pressure is 5 to 55 kg/cm².

8. The process as claimed in claim 1 wherein a persulfate is used as polymerization catalyst.

9. The process as claimed in claim 1 wherein the pressure of the system in which the melt just before the orifice is present is 5 to 15 kg/cm².

10. The process as claimed in claim 2 wherein 50 to 85 weight % of said acrylic polymer and 25 to 15 weight % of water are mixed.

11. The process as claimed in claim 2 wherein the heating temperature to obtain the melt is 110° to 300° C.

12. The process as claimed in claim 2 wherein the heating temperature to obtain the melt is 120° to 250° C.

13. The process as claimed in claim 2 wherein the pressure of the system in which the melt just before the orifice is present is 5 to 15 kg/cm².

14. The process as claimed in claim 3 wherein the plasticizer is mixed in an amount of 0.5 to 10 weight % based on the total amount of the acrylic polymer and water.

15. The process as claimed in claim 3 wherein the plasticizer is an organic liquid having a dielectric constant above 30 and/or a hydrophilic polymer.

16. The process as claimed in claim 15 wherein the plasticizer is acrylonitrile.

17. The process as claimed in claim 15 wherein the plasticizer is glycerin.

18. The process as claimed in claim 15 wherein the plasticizer is ethylene glycol.

19. The process as claimed in claim 15 wherein the plasticizer is polyvinyl alcohol.

20. The process as claimed in claim 15 wherein the plasticizer is polyethylene glycol.

21. The process as claimed in claim 3 wherein the heating temperature to obtain the melt is 110° to 300° C.

22. The process as claimed in claim 3 wherein the heating temperature to obtain the melt is 120° to 250° C.

23. The process as claimed in claim 3 wherein the pressure of the system in which the melt just before the orifice is present is 5 to 15 kg/cm$^2$.

24. The process as claimed in claim 1 or 3 wherein, prior to the heat-treatment, the foamed product is subjected to a jet stretch operation at a stretching ratio of 1.5–10 times.

25. The process as claimed in claim 1, 2 or 3 wherein the pressure of the system in which the melt just before the orifice is present is less than the pressure generated in the polymerization system.

* * * * *